US012781699B2

(12) United States Patent
Blanckenfiell et al.

(10) Patent No.: US 12,781,699 B2
(45) Date of Patent: Nov. 3, 2026

(54) COUPLING ROTATING WHEELS TO ENGINE FOR ENGINE RESTART

(71) Applicant: VOLVO TRUCK CORPORATION, Gothenburg (SE)

(72) Inventors: Magnus Blanckenfiell, Gothenburg (SE); Henrik Ryberg, Gothenburg (SE); Markus Schellenberger, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 71 days.

(21) Appl. No.: 18/910,713

(22) Filed: Oct. 9, 2024

(65) Prior Publication Data

US 2025/0137427 A1 May 1, 2025

(30) Foreign Application Priority Data

Oct. 26, 2023 (EP) .................................... 23206009

(51) Int. Cl.
*F02N 19/00* (2010.01)
*F02N 15/02* (2006.01)

(52) U.S. Cl.
CPC ........... *F02N 19/001* (2013.01); *F02N 15/02* (2013.01); *F02N 2200/022* (2013.01)

(58) Field of Classification Search
CPC .. F02N 19/001; F02N 15/02; F02N 2200/022; B60W 10/02; B60W 10/04; B60W 10/06; B60W 30/20; B60W 30/18072; B60W 30/18018; B60W 2510/0638; B60W 2710/0661; B60W 2710/0644; B60W 2300/10; B60W 2300/12; B60W 2300/17
See application file for complete search history.

(56) References Cited

U.S. PATENT DOCUMENTS 8,062,171 B2 * 11/2011 Soliman ................ B60W 10/06 477/3
10,486,676 B2 * 11/2019 Gibson ............... B60W 10/026
(Continued)

FOREIGN PATENT DOCUMENTS

DE 102013215101 A1 2/2015
DE 102018120306 A1 2/2020
(Continued)

OTHER PUBLICATIONS

Machine translation, Detailed Description, DE102013214101A1, Vogelgesang et al., obtained from https://worldwide.espacenet.com/, pp. 1-7.*
(Continued)

*Primary Examiner* — Grant Moubry
(74) *Attorney, Agent, or Firm* — Jeffri A. Kaminski; Venable LLP

(57) ABSTRACT

A computer system comprising processing circuitry configured to: receive an engine restart request for restarting an engine of a vehicle while the vehicle is moving; receive, directly from the engine, a signal encoding a real-time rotational speed of the engine; and control an actuator to gradually engage a clutch of a transmission coupled to rotating wheels of the vehicle in such a way that a rate of change of the real-time rotational speed of the engine is kept below a predefined threshold rate of change.

14 Claims, 5 Drawing Sheets

(56) References Cited

U.S. PATENT DOCUMENTS

| | | | | |
|---|---|---|---|---|
| 2013/0211698 | A1 | 8/2013 | Lewis et al. | |
| 2014/0045650 | A1* | 2/2014 | Nedorezov | B60W 10/06 477/52 |
| 2017/0144531 | A1 | 5/2017 | Yanagida et al. | |
| 2020/0164866 | A1* | 5/2020 | Suh | B60W 10/06 |
| 2020/0377099 | A1* | 12/2020 | Anderson | B60W 10/18 |
| 2021/0402865 | A1* | 12/2021 | Maurel | B60W 10/08 |

FOREIGN PATENT DOCUMENTS

| | | | |
|---|---|---|---|
| EP | 3593005 | B1 | 1/2021 |
| FR | 3063470 | A1 | 9/2018 |
| WO | 2015014614 | A2 | 2/2015 |

OTHER PUBLICATIONS

Extended European Search Report in corresponding European Application No. 23206009.5 dated Apr. 12, 2024 (9 pages).

* cited by examiner

COUPLING ROTATING WHEELS TO ENGINE FOR ENGINE RESTART

TECHNICAL FIELD

The disclosure relates generally to transmission control. In particular aspects, the disclosure relates to a system and method for coupling rotating wheels of a vehicle to an engine of the vehicle for restarting the vehicle using torque provided by the rotating wheels. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

To save fuel in a vehicle comprising an internal combustion engine, it is desirable to reduce the time during which the engine is running and consuming fuel. One way to achieve such a reduction in running time would be to turn off the engine when no torque from the engine is needed while the vehicle is moving, for instance in a slight downhill.

When the engine is again required to provide torque for moving the vehicle at a desired speed, the engine needs to be restarted.

It would be desirable to provide for engine restart that is safe, comfortable, and energy-efficient.

SUMMARY

According to a first aspect of the disclosure, there is provided a computer system comprising processing circuitry configured to: receive an engine restart request for restarting an engine of a vehicle while the vehicle is moving; receive, directly from the engine, a signal encoding a real-time rotational speed of the engine; and control an actuator to gradually engage a clutch of a transmission coupled to rotating wheels of the vehicle in such a way that a rate of change of the real-time rotational speed of the engine is kept below a predefined threshold rate of change. The first aspect of the disclosure may seek to substantially eliminate or at least reduce a delay between sensing of a real-time rotational speed of the engine and reception of a signal encoding the real-time rotational speed of the engine by the processing circuitry that is tasked with controlling the coupling between the transmission (and hence the rotating wheels) and the engine. A technical benefit may include that the moment of inertia of the rotating wheels can be used to restart the engine instead of an electric starter motor, which provides for improved energy-efficiency. A further technical benefit may include that the true real-time information about the real-time rotational speed of the engine can be used for controlling the coupling between the rotating wheels and the driveshaft of the engine in such a way that the rate of change of the real-time rotational speed of the engine is kept below a predefined threshold rate of change. This, in turn, reduces the risk of jerks and wheel slip during the engine restart, which provides for improved comfort and/or safety.

Optionally in some examples, including in at least one preferred example, the signal encoding the real-time rotational speed of the engine may be a pulse train, where a time between adjacent pulses in the pulse train indicate the real-time rotational speed of the engine. A technical benefit may include that such a pulse train may be a “raw” sensing signal that has not been subjected to any signal processing, which provides for reduced latency and thereby improved control of the actuator for gradually engaging the clutch.

Optionally in some examples, including in at least one preferred example, the computer system may be configured to receive the signal encoding the real-time rotational speed of the engine directly from a rotation sensor arranged to measure the real-time rotational speed of a driveshaft of the engine. A technical benefit may include to further reduce the delay of the signal encoding the real-time rotational speed of the driveshaft, which in turn provides for improved control of the actuator for gradually engaging the clutch.

Optionally in some examples, including in at least one preferred example, the rotation sensor may be arranged to measure the real-time rotational speed of a flywheel of the engine, the flywheel being coupled to the driveshaft of the engine. A technical benefit may include to provide for convenient sensing of the rotation, which may be easier to do on the flywheel than directly on the driveshaft.

Optionally in some examples, including in at least one preferred example, the computer system may be configured to: control the actuator to disengage the clutch in response to the real-time rotational speed of the engine increasing to a predefined first threshold rotational speed. A technical benefit may include to provide for disconnection of the engine from the rotating wheels immediately when the real-time rotational speed of the driveshaft of the engine is sufficient for starting to inject fuel into at least one combustion chamber of the internal combustion engine. This may, in turn, provide for smoother operation of the vehicle and less wear on the clutch and/or other parts of the driveline, including the transmission. As soon as the processing circuitry of the computer system in some examples determines that the engine is running sustainably, the processing circuitry may control the actuator to gradually engage the clutch again, so that torque can be transmitted from the engine to the wheels.

Optionally in some examples, including in at least one preferred example, the computer system may be configured to: control the actuator to engage the clutch in response to the real-time rotational speed of the engine decreasing to a predefined second threshold rotational speed, lower than the first threshold rotational speed. A technical benefit may include that the engine can smoothly be brought up to sufficient speed for starting combustion operation again in the event that the speed of the engine has decreased to an insufficient speed before the engine has had time to start, for instance due to a delay in the fuel injection.

Optionally in some examples, including in at least one preferred example, the computer system may be included in a transmission control unit comprised in a transmission of a vehicle, and the processing circuitry may be configured to: receive an engine restart request for restarting an engine of the vehicle while the vehicle is moving and the engine is off; receive, directly from the engine through a signal line directly connecting a signal source comprised in the engine and the transmission control unit, a signal encoding a real-time rotational speed of the engine, the signal being a pulse train, a time between adjacent pulses in the pulse train indicating the real-time rotational speed of the engine; control an actuator to gradually engage a clutch of a transmission coupled to rotating wheels of the vehicle in such a way that a rate of change of the real-time rotational speed of the engine is kept below a predefined threshold rate of change; control the actuator to disengage the clutch in response to the real-time rotational speed of the engine increasing to a predefined first threshold rotational speed; and control the actuator to engage the clutch in response to the real-time rotational speed of the engine decreasing from the first threshold rotational speed to a predefined second threshold rotational speed, lower than the first threshold rotational speed.

The computer system according to various examples or combinations of examples may advantageously be included in a vehicle.

In some examples, including in at least one preferred example, the vehicle may further comprise an engine; wheels; and a transmission coupled between the engine and the wheels, the transmission having a clutch controllable by the computer system to gradually engage with the engine to gradually change a torque transfer between the engine and the wheels.

According to a second aspect of the disclosure, there is provided a computer-implemented method, comprising: receiving, by processing circuitry of a computer system, an engine restart request for restarting an engine of a vehicle while the vehicle is moving; receiving, by the processing circuitry, directly from the engine, a signal encoding a real-time rotational speed of the engine; and controlling, by the processing circuitry, an actuator to gradually engage a clutch of a transmission coupled to rotating wheels of the vehicle in such a way that a rate of change of the real-time rotational speed of the engine is kept below a predefined threshold rate of change. The second aspect of the disclosure may seek to substantially eliminate or at least reduce a delay between sensing of a real-time rotational speed of the engine and reception of a signal encoding the real-time rotational speed of the engine by the processing circuitry that is tasked with controlling the coupling between the transmission (and hence the rotating wheels) and the engine. A technical benefit may include that the moment of inertia of the rotating wheels can be used to restart the engine instead of an electric starter motor, which provides for improved energy-efficiency. A further technical benefit may include that the true real-time information about the real-time rotational speed of the engine can be used for controlling the coupling between the rotating wheels and the driveshaft of the engine in such a way that the rate of change of the real-time rotational speed of the engine is kept below a predefined threshold rate of change. This, in turn, reduces the risk of jerks and wheel slip during the engine restart, which provides for improved comfort and/or safety.

Optionally in some examples, including in at least one preferred example, the method may comprise controlling, by the processing circuitry, the actuator to disengage the clutch in response to the real-time rotational speed of the engine increasing to a predefined first threshold rotational speed. A technical benefit may include to provide for disconnection of the engine from the rotating wheels immediately when the real-time rotational speed of the driveshaft of the engine is sufficient for starting to inject fuel into at least one combustion chamber of the internal combustion engine. This may, in turn, provide for smoother operation of the vehicle and less wear on the clutch and/or other parts of the driveline, including the transmission. As soon as it is determined that the engine is running sustainably, the actuator may be controlled to gradually engage the clutch again, so that torque can be transmitted from the engine to the wheels.

Optionally in some examples, including in at least one preferred example, the method may comprise controlling, by the processing circuitry, the actuator to engage the clutch in response to the real-time rotational speed of the engine decreasing to a predefined second threshold rotational speed, lower than the first threshold rotational speed. A technical benefit may include that the engine can smoothly be brought up to sufficient speed for starting combustion operation again in the event that the speed of the engine has decreased to an insufficient speed before the engine has had time to start, for instance due to a delay in the fuel injection.

Optionally in some examples, including in at least one preferred example, the method may comprise receiving, by the processing circuitry, an engine restart request for restarting an engine of a vehicle while the vehicle is moving and the engine is off; receiving, by the processing circuitry directly from the engine through a signal line directly connecting a signal source comprised in the engine and the transmission control unit, a signal encoding a real-time rotational speed of the engine, the signal being a pulse train, a time between adjacent pulses in the pulse train indicating the real-time rotational speed of the engine; controlling, by the processing circuitry, an actuator to gradually engage a clutch of a transmission coupled to rotating wheels of the vehicle in such a way that a rate of change of the real-time rotational speed of the engine is kept below a predefined threshold rate of change; controlling, by the processing circuitry, the actuator to disengage the clutch in response to the real-time rotational speed of the engine increasing to a predefined first threshold rotational speed; and controlling, by the processing circuitry, the actuator to engage the clutch in response to the real-time rotational speed of the engine decreasing from the first threshold rotational speed to a predefined second threshold rotational speed, lower than the first threshold rotational speed.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
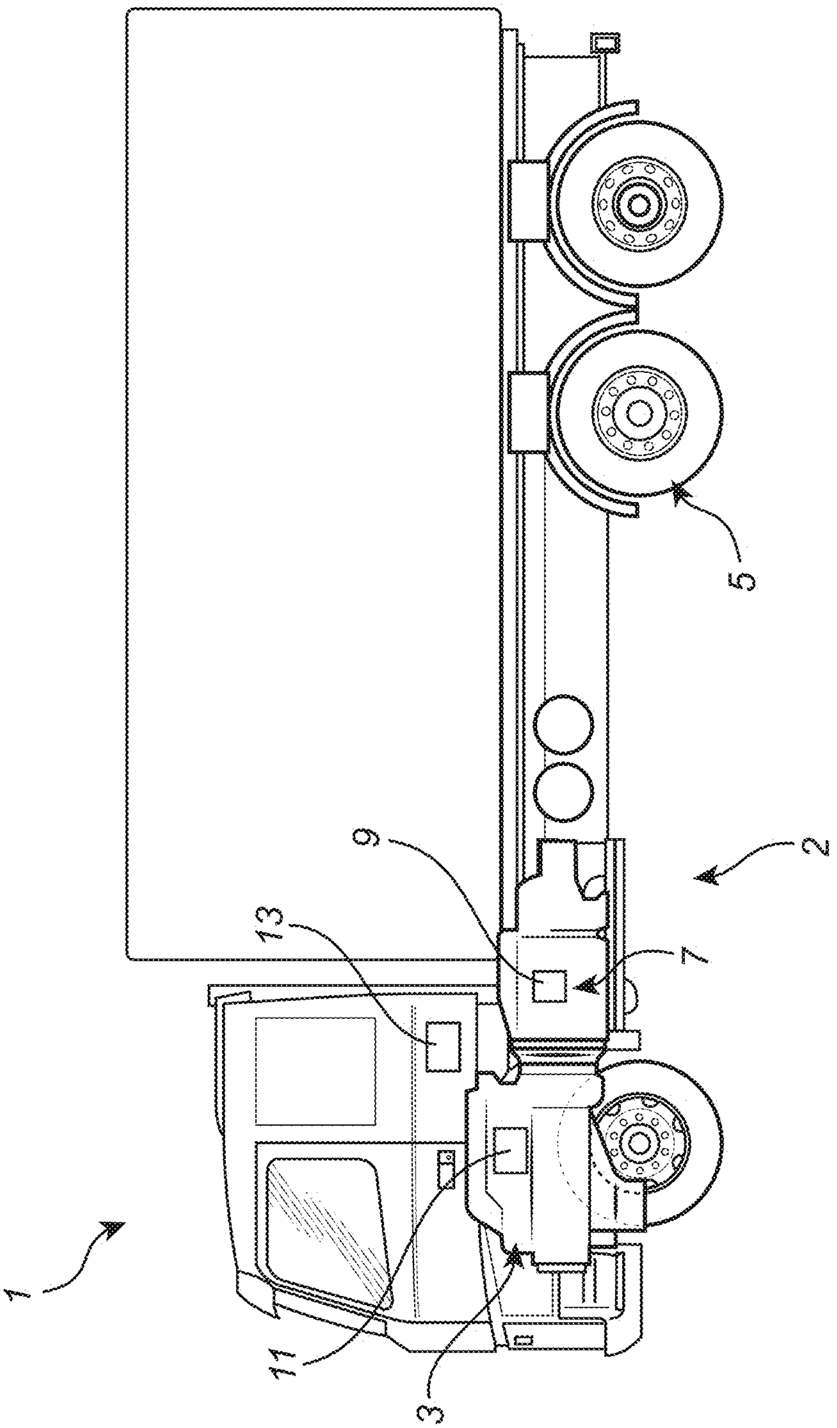
FIG. 1 is an exemplary vehicle according to an example.

FIG. 1 is an exemplary vehicle 1 according to an example. Referring to FIG. 1, the exemplary vehicle 1 comprises a drive train arrangement 2 including an internal combustion engine 3, vehicle wheels 5, a transmission 7, a transmission control unit 9, and an engine control unit 11. Operation of the exemplary vehicle 1 in FIG. 1, including the drive train arrangement 2, is controlled by a vehicle control unit 13.

Figure 2:
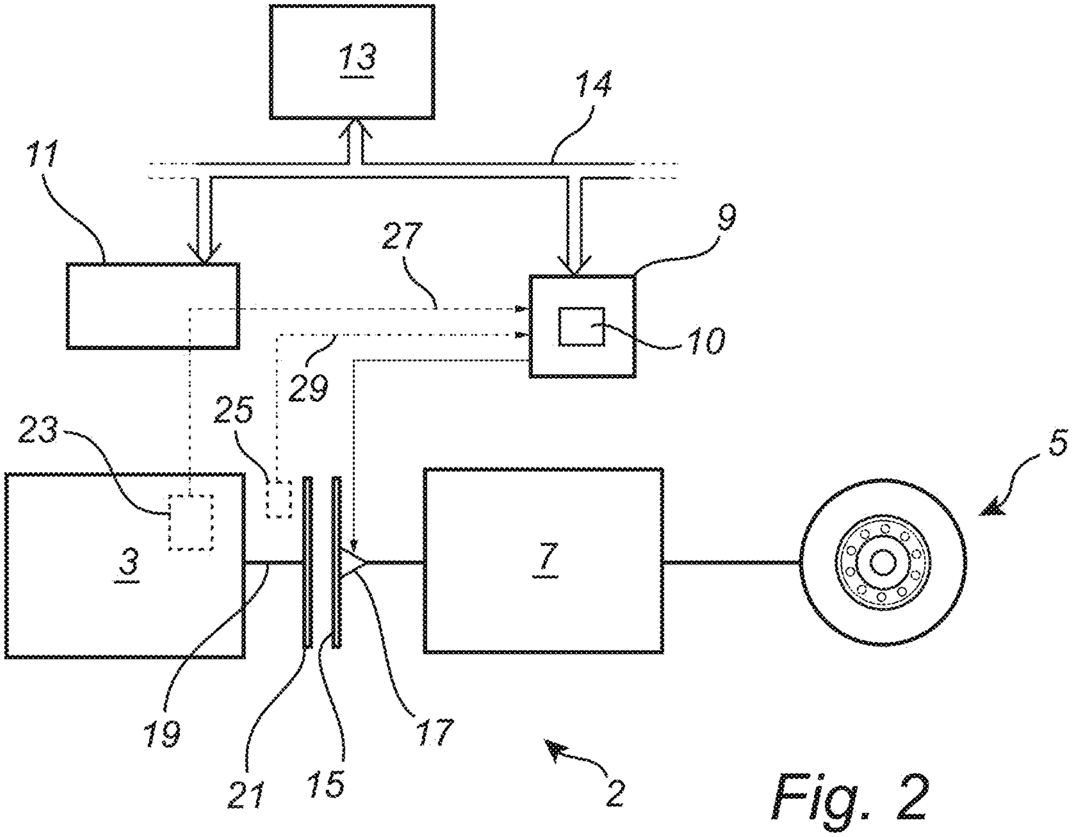
FIG. 2 is an exemplary drive train arrangement according to an example.

FIG. 2 is an exemplary drive train arrangement 2 according to an example. Referring to FIG. 2, the exemplary drive train arrangement 2 comprises an internal combustion engine (ICE) 3, a transmission 7, at least one vehicle wheel 5, a transmission control unit 9 for controlling operation of the transmission 7, and an engine control unit 11 for controlling the engine 3. As is schematically illustrated in FIG. 2, the transmission control unit 9 and the engine control unit 11 may be connected to a vehicle control unit 13 via a communication bus 14, such as a CAN-bus. As is schematically shown in FIG. 2, the transmission 7 may comprise a clutch 15, and an actuator 17 operatively coupled to the clutch 15. The engine 3 may comprise a driveshaft 19 and a flywheel 21 operatively coupled to the driveshaft 19. A real-time rotational speed of the engine 3 may be measured by, for example, an internal rotation sensor 23 that directly senses rotation of the driveshaft 19 or a flywheel rotation sensor 25 that senses rotation of the flywheel. The transmission control unit 9 comprises processing circuitry 10 that is coupled to the actuator 17 and configured to control the actuator 17 to engage the clutch 15 of the transmission 7 so that the drive shaft 19 of the engine 3 is coupled to the vehicle wheels 5 via the transmission 7.

During normal operation of the vehicle 1, the transmission control unit 9, the engine control unit 11, as well as other control units of the vehicle 1 may be controlled by the vehicle control unit 13 by means of commands communicated via the communication bus 14. Although this kind of communication via the communication bus 14 may generally be sufficient for satisfactory control of the operation of the vehicle 1, the present inventors have found that the delay introduced by communication via the communication bus 14 may result in jerks and/or wheel slip and/or excessive component wear if the communication bus 14 is used for communicating information of the real-time rotational speed of the engine 3 to the transmission control unit 9.

The present inventors have realized that such jerks and/or wheel slip and/or excessive component wear can be mitigated by providing the processing circuitry 10 comprised in the transmission control unit 9 with a signal encoding a real-time rotational speed of the engine 3 directly from the engine 3 to the transmission control unit 9, and then using this directly received signal to control the actuator 17 to gradually engage the clutch 15 of the transmission 7 coupled to rotating wheels 5 of the vehicle 1 in such a way that a rate of change of the real-time rotational speed of the engine 3 is kept below a predefined threshold rate of change. The direct provision of the signal encoding the real-time rotational speed of the engine 3 is illustrated in FIG. 2 by two example configurations represented by the dashed line 27 directly connecting the internal rotation sensor 23, through the engine control unit 11, with the transmission control unit 9, and the dashed line 29 directly connecting the flywheel rotational sensor 25 with the transmission control unit 9, respectively. The direct connection between the sensor and the processing circuitry 10 of the transmission control unit 9 may advantageously be provided by a direct signal line, such as a conductive wire, whereby the signal encoding the real-time rotational speed of the engine 3 can be received with practically no delay.

Figure 3:
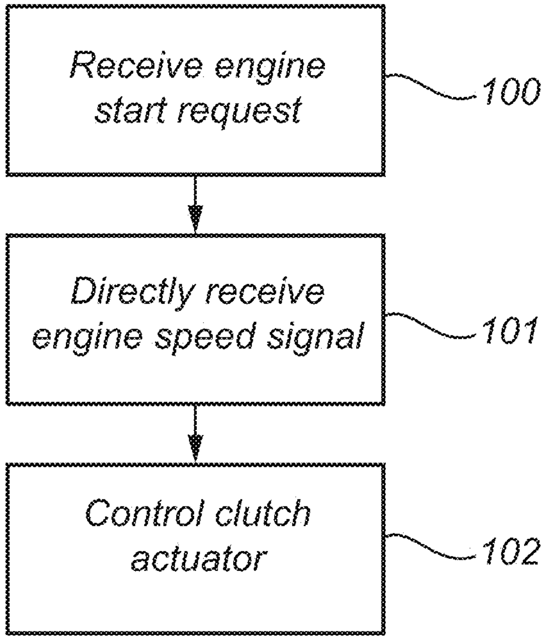
FIG. 3 is an exemplary method according to an example.

FIG. 3 is an exemplary computer-implemented method. The method comprises receiving 100, by processing circuitry 10 of a computer system, an engine restart request for restarting an engine 3 of a vehicle 1 while the vehicle is moving. The engine restart request, which may result from a torque demand, may be provided to the computer system, here in the form of the transmission control unit 9, from the vehicle control unit 13, via the communication bus 14. The engine restart request may also be provided to the engine control unit 11. The method further comprises receiving 101, by the processing circuitry 10, directly from the engine 3, a signal encoding a real-time rotational speed of the engine 3. As was also mentioned above, the signal may advantageously be provided by a direct signal line, such as a conductive wire, whereby the signal encoding the real-time rotational speed of the engine 3 can be received by the processing circuitry 10 with practically no delay. The method further comprises controlling 102, by the processing circuitry 10, an actuator 17 to gradually engage a clutch 15 of the transmission 7 coupled to rotating wheels 5 of the vehicle 1 in such a way that a rate of change of the real-time rotational speed of the engine 3 is kept below a predefined threshold rate of change. If the rate of change of the real-time rotational speed of the engine 3 is too high, this may be felt as a jerk of the vehicle 1 and/or the wheels 5 may slip, potentially resulting in unwanted degradation of the vehicle motion. Furthermore, a too high rate of change of the real-time rotational speed of the engine may be an indication of excessive wear on components of the transmission, such as the clutch 15. It should be noted that this kind of control may not be possible when based on a “real-time” rotational speed of the engine 3 obtained via the communication bus 14, which is in fact a delayed version of the real-time rotational speed of the engine 3.

Figure 4:
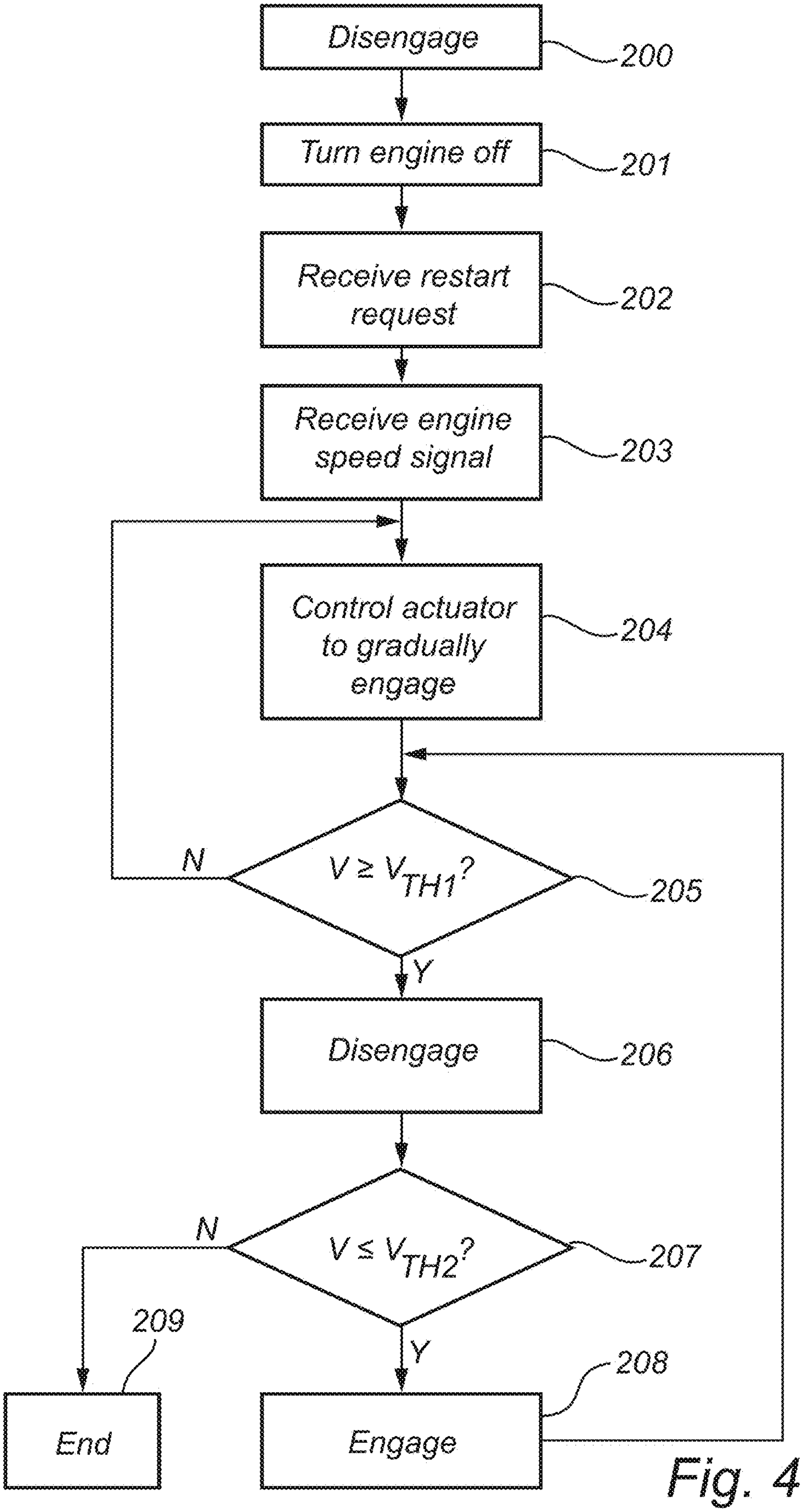
FIG. 4 is an exemplary method according to an example.

FIG. 4 is an exemplary computer-implemented method. The method comprises receiving 200, by processing circuitry 10 of a computer system, a command to disengage the clutch 15 to disconnect the vehicle wheels 5 from the engine 3. When disengaged, the engine 3 is turned off 201 by the engine control unit 11. When the vehicle control unit 13 has determined that torque should be supplied by the engine 3 to the vehicle wheels 5, the vehicle control unit 13 provides an engine restart request, which is received 202 by the transmission control unit 9 and the engine control unit 11. Processing circuitry 10 of the transmission control unit 9 receives 203 a signal encoding a real-time rotational speed of the engine 3, directly from the engine 3 through a signal line directly connecting a signal source comprised in the engine 3 and the transmission control unit 9. As was described above with reference to FIG. 2, the signal source may, for example, be an internal rotation sensor 23, or a flywheel rotation sensor 25, and the signal line may be routed through the engine control unit 11, as indicated by the dashed line 27 in FIG. 2, or directly from the rotation sensor, as indicated by the dashed line 29 in FIG. 2. This signal encoding the real-time rotational speed of the engine 3 may be continuously received and evaluated by the transmission control unit 9, or provision and/or evaluation of the signal may be triggered by the engine restart request.

Figure 5A:
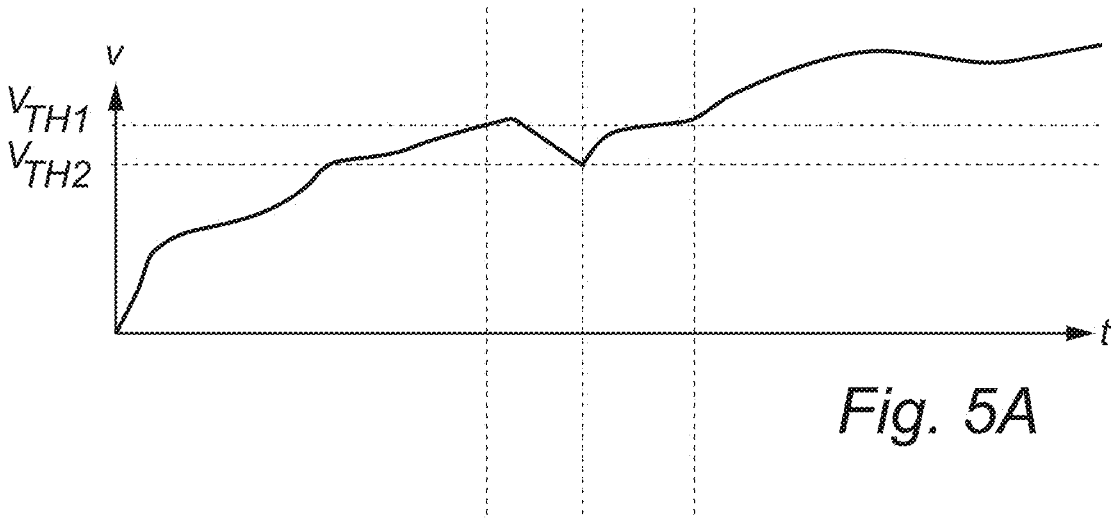
FIG. 5A-C are diagrams illustrating exemplary control of the actuator in a method according to an example.
Figure 5B:
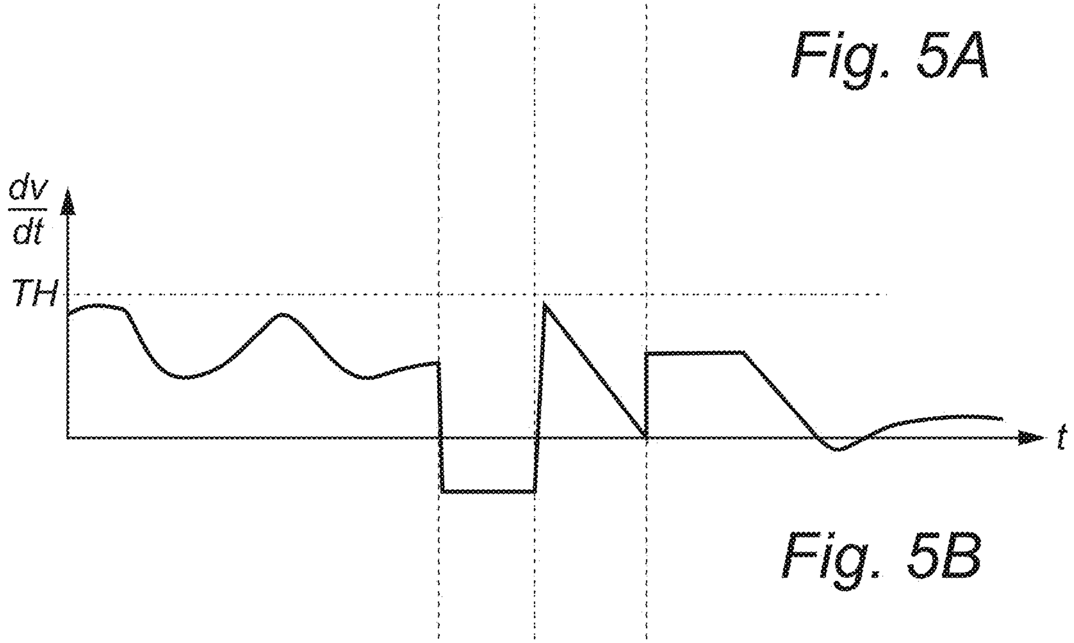
Figure 5C:
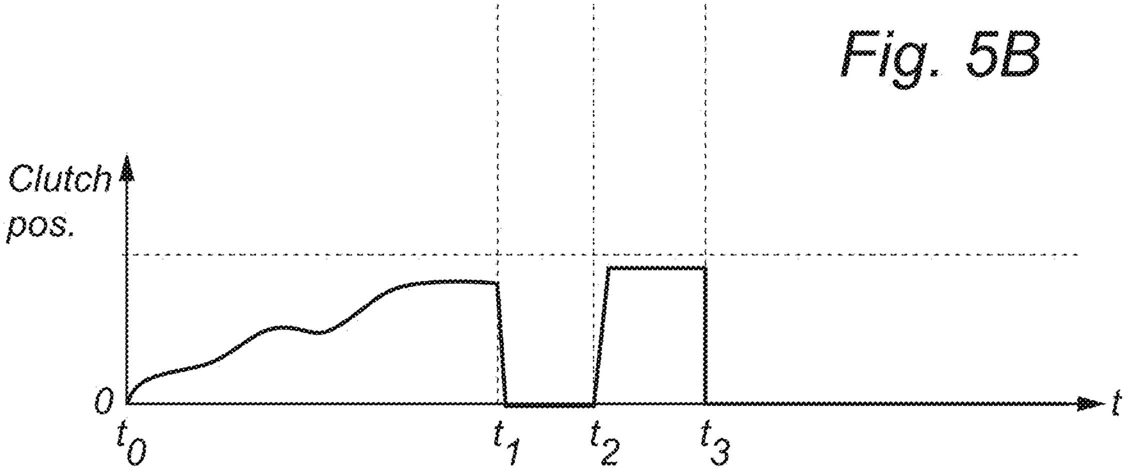

Referring now to FIGS. 5A-C, which are diagrams illustrating exemplary control of the actuator 17 of the transmission 7, the engine restart request has been received and the signal encoding the real-time rotational speed of the engine 3 is being received at the time to in FIGS. 5A-C. FIG. 5A illustrates an example of the real-time rotational speed v of the engine 3 as a function of time. FIG. 5B illustrates an example of the rate of change dv/dt of the real-time rotational speed of the engine 3 as a function of time. FIG. 5C illustrates an example of the clutch position as a function of time. In the diagram in FIG. 5C, the clutch position ‘0’ indicates that the clutch 15 is fully disengaged, and the clutch position ‘1’ indicates that the clutch 15 is fully engaged. Between these clutch positions, the clutch is partly engaged, and there is a difference in rotational speed between the driveshaft of the engine 3 and the clutch member coupled to the transmission 7.

The processing circuitry 10 of the transmission control unit 9 then controls 204, while continuously receiving the signal encoding the real-time rotational speed of the engine 3, the actuator 17 to gradually engage the clutch 15 in such a way that the rate of change of the real-time rotational speed of the engine 3 is kept below a predefined threshold rate of change TH. By gradually engaging the clutch 15 in this manner, the engine 3 can be brought up to speed using the rotation of the vehicle wheels 5 substantially without jerks and/or wheel slip. This gradual engagement of the clutch 15 is schematically represented by the time period between $t_0$ and $t_1$ in FIGS. 5A-C. During this time period, the clutch 15 is gradually engaged, starting from clutch position '0' as indicated in FIG. 5C. As a result, the real-time rotational speed v of the engine 3 increases, as is indicated in FIG. 5A, while the clutch position is modulated to maintain the rate of change dv/dt of the rotational speed below the predefined threshold TH. This threshold, which may be a static or dynamic threshold, may be related to expected occurrence of jerks and/or wheel spin. The rate of change dv/dt is schematically illustrated in FIG. 5B.

The gradual engagement of the clutch 15 continues as long as the real-time rotational speed v of the engine 3 has not reached a predefined first threshold speed $v_{TH1}$, which is sufficient for causing the engine to run independently by combustion of fuel. When it is determined 205 (Y) that the real-time rotational speed v of the engine has reached the first threshold speed $v_{TH1}$, the processing circuitry 10 of the transmission control unit 9 controls the actuator 17 to disengage 206 the clutch 15. If fuel injection has not yet started, or fuel has not yet reached the combustion chamber(s) of the engine 3, this results in a gradual reduction of the rotational speed v of the engine 3, as is schematically indicated in FIG. 5A.

When it is determined 207 (Y) that the real-time rotational speed v of the engine has dropped to the second threshold speed $v_{TH2}$, which is lower than the first threshold speed $v_{TH1}$, the processing circuitry 10 of the transmission control unit 9 controls the actuator 17 to engage 208 the clutch 15 at the time $t_2$. The process returns to the evaluation 205 of whether or not the rotational speed of the engine has reached the first threshold speed $v_{TH1}$.

When the rotation speed v of the engine 3 again reaches the first threshold speed $v_{TH1}$, at the time $t_3$, the processing circuitry 10 again controls the actuator 17 to disengage the clutch 15. At this time in the schematic process in FIGS. 5A-C, the fuel injection has started and the engine 3 starts to run independently. In response to a signal indicating this, or following a suitable timeout, the method terminates 209.

Figure 6:
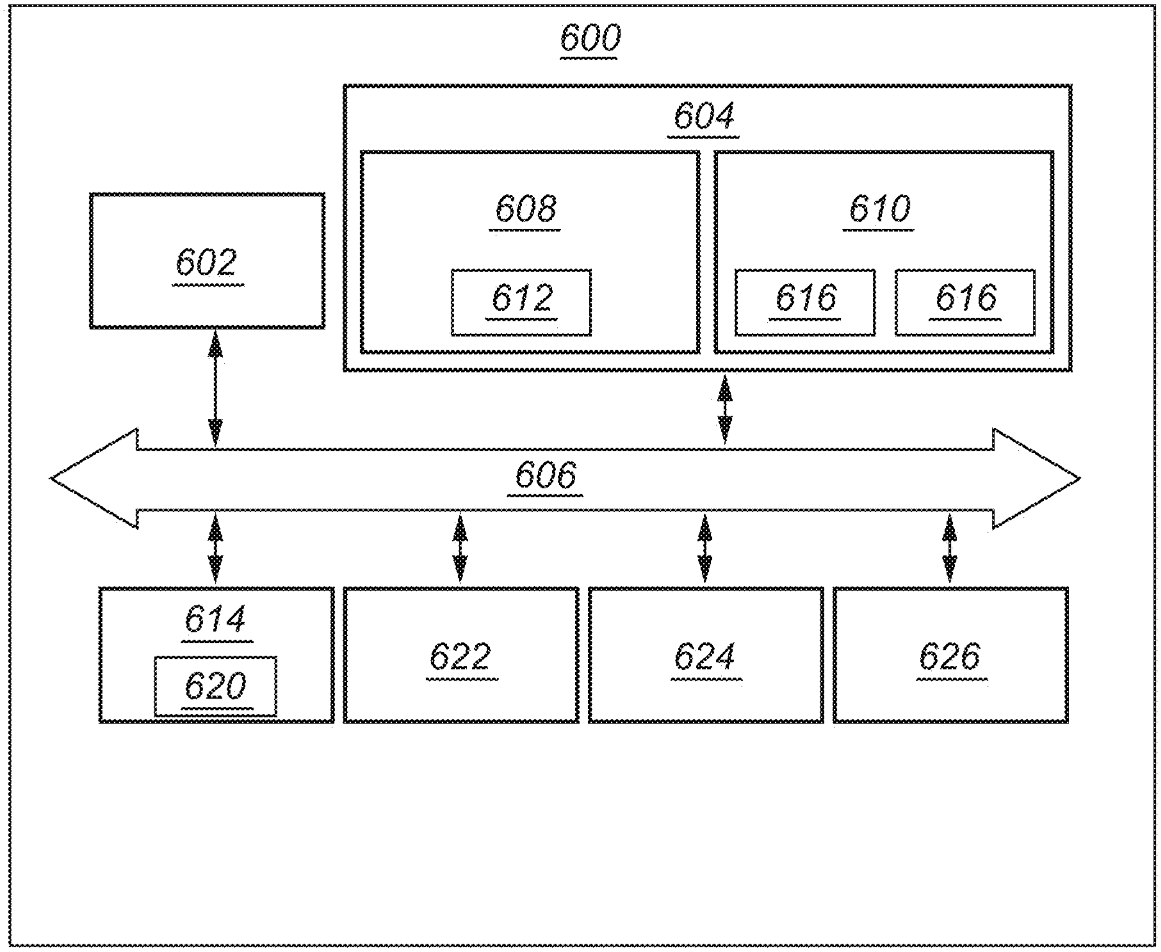
FIG. 6 is a schematic diagram of an exemplary computer system for implementing examples disclosed herein, according to an example.

FIG. 6 is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include processing circuitry 602 (e.g., processing circuitry including one or more processor devices or control units), a memory 604, and a system bus 606. The computer system 600 may include at least one computing device having the processing circuitry 602. The system bus 606 provides an interface for system components including, but not limited to, the memory 604 and the processing circuitry 602. The processing circuitry 602 may include any number of hardware components for conducting data or signal processing or for executing computer code stored in memory 604. The processing circuitry 602 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 602 may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processing circuitry 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with processing circuitry 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program 620 stored on a transitory or non-transitory computer-usable or computer-readable storage medium (e.g., single medium or multiple media), such as the storage device 614, which includes complex programming instructions (e.g., complex computer-readable program code) to cause the processing circuitry 602 to carry out actions described herein. Thus, the computer-readable program code of the computer program 620 can comprise software instructions for implementing the functionality of the examples described herein when executed by the processing circuitry 602. In some examples, the storage device 614 may be a computer program product (e.g., readable storage medium) storing the computer program 620 thereon, where at least a portion of a computer program 620 may be loadable (e.g., into a processor) for implementing the functionality of the examples described herein when executed by the processing circuitry 602. The processing circuitry 602 may serve as a controller or control system for the computer system 600 that is to implement the functionality described herein.

The computer system 600 may include an input device interface 622 configured to receive input and selections to be communicated to the computer system 600 when executing instructions, such as from a keyboard, mouse, touch-sensitive surface, etc. Such input devices may be connected to the processing circuitry 602 through the input device interface 622 coupled to the system bus 606 but can be connected through other interfaces, such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may include a communications interface 626 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to:

receive an engine restart request for restarting an engine of a vehicle while the vehicle is moving;

receive, directly from the engine, a signal encoding a real-time rotational speed of the engine; and restart the engine by controlling an actuator to gradually engage a clutch of a transmission coupled to rotating wheels of the vehicle in such a way that a rate of change of the real-time rotational speed of the engine is kept below a predefined threshold rate of change.

2. The computer system of claim 1, wherein the signal encoding the real-time rotational speed of the engine is a pulse train, a time between adjacent pulses in the pulse train indicating the real-time rotational speed of the engine.

3. The computer system of claim 1, wherein the computer system is configured to receive the signal encoding the real-time rotational speed of the engine directly from a rotation sensor arranged to measure a real-time rotational speed of a driveshaft of the engine.

4. The computer system of claim 3, wherein the rotation sensor is arranged to measure a real-time rotational speed of a flywheel of the engine, the flywheel being coupled to the driveshaft of the engine.

5. The computer system of claim 1, wherein the computer system is configured to:

control the actuator to disengage the clutch in response to the real-time rotational speed of the engine increasing to a predefined first threshold rotational speed.

6. The computer system of claim 5, wherein the computer system is configured to:

control the actuator to engage the clutch in response to the real-time rotational speed of the engine decreasing to a predefined second threshold rotational speed, lower than the first threshold rotational speed.

7. The computer system of claim 1, wherein the computer system is comprised in a transmission control unit comprised in a transmission of a vehicle, and the processing circuitry is configured to:

receive the engine restart request for restarting the engine of the vehicle while the vehicle is moving and the engine is off;

receive, directly from the engine through a signal line directly connecting a signal source comprised in the engine and the transmission control unit, the signal encoding the real-time rotational speed of the engine, the signal being a pulse train, a time between adjacent pulses in the pulse train indicating the real-time rotational speed of the engine;

control the actuator to gradually engage the clutch of the transmission coupled to rotating wheels of the vehicle in such a way that the rate of change of the real-time rotational speed of the engine is kept below the predefined threshold rate of change;

control the actuator to disengage the clutch in response to the real-time rotational speed of the engine increasing to a predefined first threshold rotational speed; and control the actuator to engage the clutch in response to the real-time rotational speed of the engine decreasing from the first threshold rotational speed to a predefined second threshold rotational speed, lower than the first threshold rotational speed.

8. A vehicle comprising the computer system of claim 1.

9. The vehicle of claim 8, further comprising:

the engine;

wheels; and the transmission coupled between the engine and the wheels, the transmission having the clutch controllable by the computer system to gradually engage with the engine to gradually change a torque transfer between the engine and the wheels.

10. A computer-implemented method, comprising:

receiving, by processing circuitry of a computer system, an engine restart request for restarting an engine of a vehicle while the vehicle is moving;

receiving, by the processing circuitry, directly from the engine, a signal encoding a real-time rotational speed of the engine; and restarting the engine by controlling, by the processing circuitry, an actuator to gradually engage a clutch of a transmission coupled to rotating wheels of the vehicle in such a way that a rate of change of the real-time rotational speed of the engine is kept below a predefined threshold rate of change.

11. The method of claim 10, wherein the method comprises:

controlling, by the processing circuitry, the actuator to disengage the clutch in response to the real-time rotational speed of the engine increasing to a predefined first threshold rotational speed.

12. The method of claim 11, wherein the method comprises:

controlling, by the processing circuitry, the actuator to engage the clutch in response to the real-time rotational speed of the engine decreasing to a predefined second threshold rotational speed, lower than the first threshold rotational speed.

13. The method of claim 10, wherein the method comprises:

receiving, by the processing circuitry, the engine restart request for restarting the engine of the vehicle while the vehicle is moving and the engine is off;

receiving, by the processing circuitry directly from the engine through a signal line directly connecting a signal source comprised in the engine and the transmission control unit, the signal encoding the real-time rotational speed of the engine, the signal being a pulse train, a time between adjacent pulses in the pulse train indicating the real-time rotational speed of the engine;

controlling, by the processing circuitry, the actuator to gradually engage the clutch of the transmission coupled to rotating wheels of the vehicle in such a way that the rate of change of the real-time rotational speed of the engine is kept below the predefined threshold rate of change;

controlling, by the processing circuitry, the actuator to disengage the clutch in response to the real-time rotational speed of the engine increasing to a predefined first threshold rotational speed; and controlling, by the processing circuitry, the actuator to engage the clutch in response to the real-time rotational speed of the engine decreasing from the first threshold rotational speed to a predefined second threshold rotational speed, lower than the first threshold rotational speed.

14. A non-transitory computer-readable storage medium comprising instructions, which when executed by processing circuitry, cause the processing circuitry to perform the method of claim 10.

* * * * *